Figure 1:
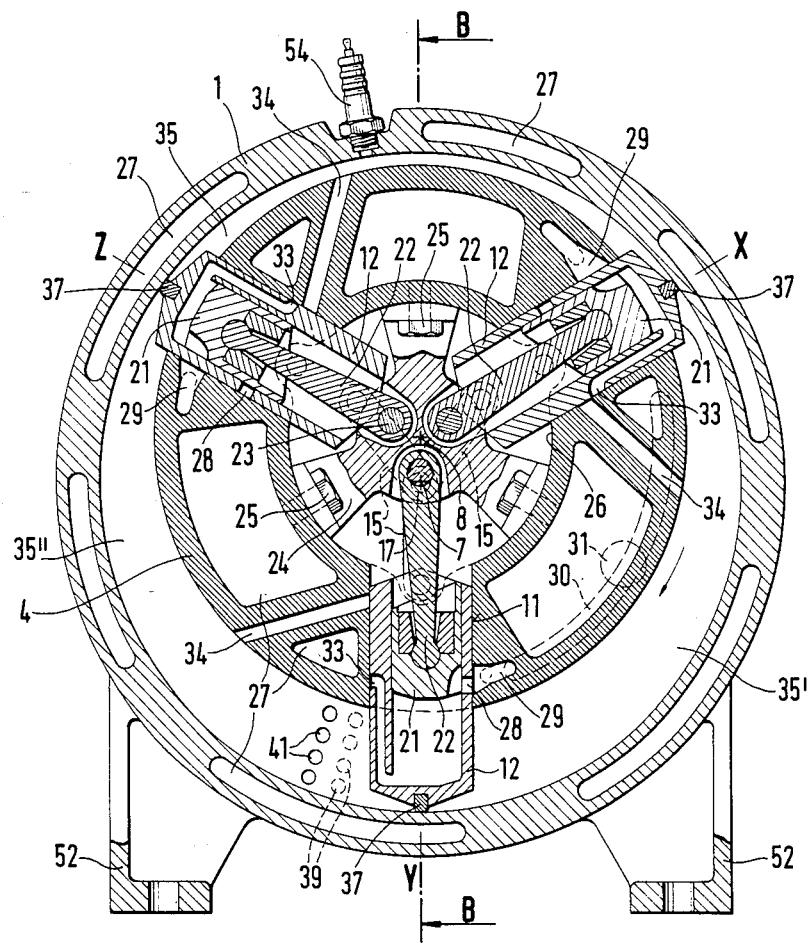

United States Patent [19]

Aase

[11] Patent Number: 4,688,531
[45] Date of Patent: Aug. 25, 1987

[54] ROTARY INTERNAL COMBUSTION ENGINE

[76] Inventor: Jan M. Aase, Baerheim, N-4301 Sandnes, Norway

[21] Appl. No.: 882,894
[22] PCT Filed: Oct. 21, 1985
[86] PCT No.: PCT/NO85/00068
§ 371 Date: Jun. 30, 1986
§ 102(e) Date: Jun. 30, 1986
[87] PCT Pub. No.: WO86/02698
PCT Pub. Date: May 9, 1986

[30] Foreign Application Priority Data
Nov. 2, 1984 [NO] Norway .................. 844350

[51] Int. Cl.[4] .................................... F02B 53/00
[52] U.S. Cl. .................................... 123/227
[58] Field of Search ............... 123/223, 224, 226, 227

[56] References Cited

U.S. PATENT DOCUMENTS

| | | | |
|---|---|---|---|
| 997,824 | 7/1911 | Jacobsen | 123/227 |
| 1,308,339 | 7/1919 | Debnam | 123/227 |
| 1,358,450 | 11/1920 | Kawate | 123/227 |
| 1,602,018 | 10/1926 | Harvey | 123/222 |
| 3,398,725 | 8/1968 | Null | 123/227 |
| 3,429,301 | 2/1969 | Sandidge | 123/227 |

FOREIGN PATENT DOCUMENTS

2610130 9/1977 Fed. Rep. of Germany ...... 123/227

*Primary Examiner*—Michael Koczo
*Attorney, Agent, or Firm*—Schwartz, Jeffery, Schwaab, Mack, Blumenthal & Evans

[57] ABSTRACT

In a rotary internal combustion engine with a rotor housing (1, 2, 3, 19, 20) in which a rotor (4) is eccentrically supported, preferably three radial bores (11) at mutual equal angular distance are provided. In each of the bores (11) a sliding cylinder sleeve (12) is installed which is closed at its outer end which faces out towards the cylindrical inside of the rotor housing (1). The cylinder sleeve (12) is fastened rotatably at its inner, open end to the end covers (19, 20) of the rotor housing (1) such that the cylinder sleeves (12) turn concentrically about the center line (7') of the rotor housing (1) as the rotor rotates. A sliding piston (21) is arranged in each cylinder sleeve (12), said piston (21) being fastened using connections (22, 23, 24, 25) to the rotor (4) such that each piston (21) is the same distance from the center line (8') of the rotor (4) and rotates concentrically about this center line. As the rotor (4) rotates, there occurs a relative movement between each cylinder sleeve (12) and its associated piston (21) without any of the parts reciprocating. The cylinder cavity above the piston (21) is charged with a gas mixture which is compressed and released into the rotor housing (1) where the gas mixture is ignited and turns the rotor (4). Exhaust outlet is arranged in the end plate (3) of the rotor housing (1).

4 Claims, 2 Drawing Figures

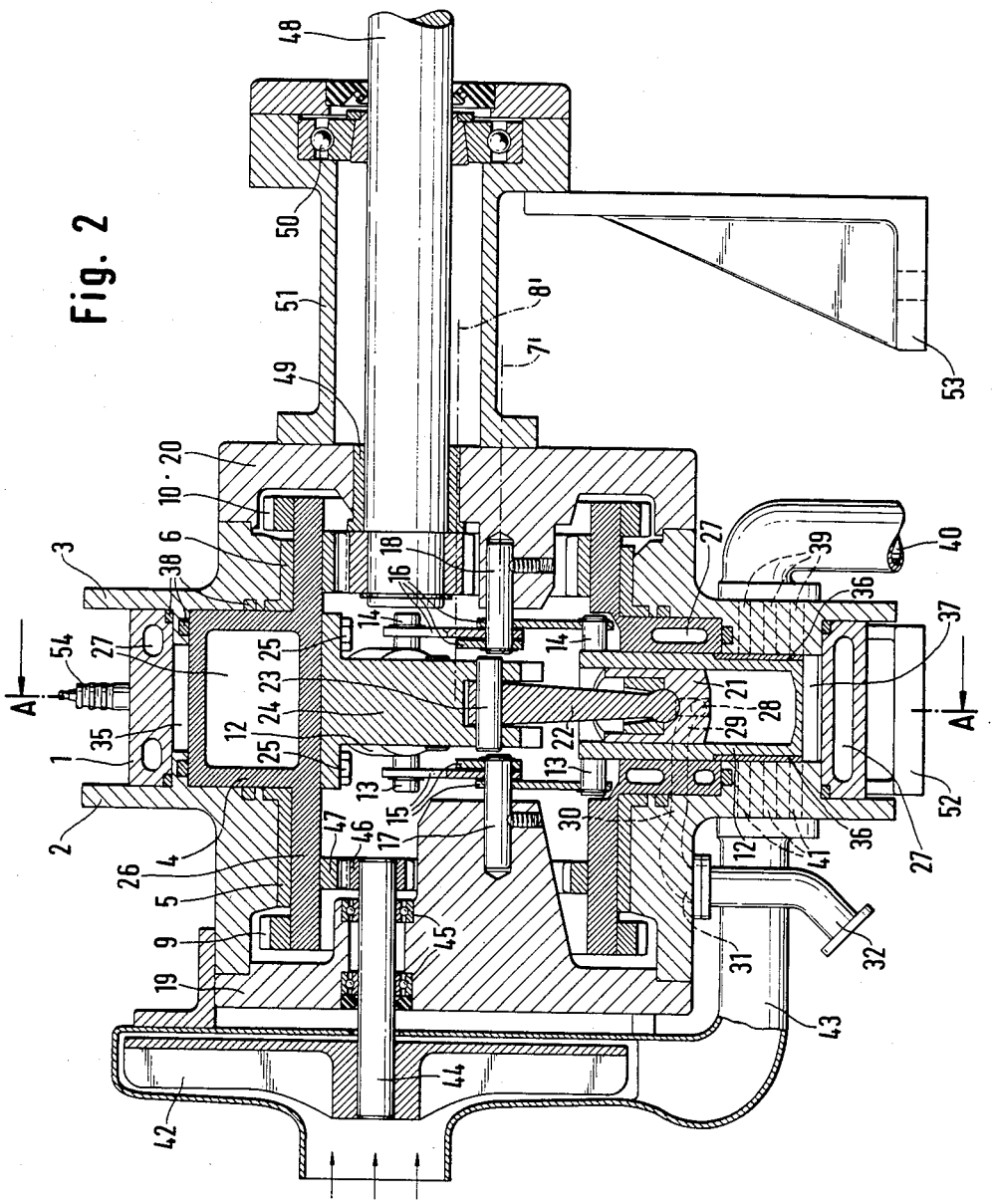

ROTARY INTERNAL COMBUSTION ENGINE

This invention relates to a rotary two-stroke internal combustion engine with arrangements for the introduction of fuel and removal of exhaust gases.

The object of the invention is to provide a rotary internal combustion engine which has a minimum of moving parts, which has a large power to weight and power to size ratio, which runs evenly and has relatively high power even at low revolutions, and which can work at high compression ratio.

This is achieved through the features stated in the following patent claims.

An exemplary embodiment of the invention is illustrated schematically in the accompanying drawings, wherein:

FIG. 1 shows a cross-section through a rotary internal combustion engine according to the invention, along the line A-A on FIG. 2, and FIG. 2 shows a longitudinal section through the same engine, this time along the line B-B on FIG. 1.

On the drawings the reference number 1 designates a cylindrical rotor housing with end plates 2, 3. In the end plates 2, 3 of rotor housing 1 is a rotor 4 eccentrically mounted at 5, 6. In FIG. 1 the center of the rotor housing 1 is designated 7, and the center of the rotor 4 is designated 8. In FIG. 2 the center line of the rotor housing 1 is designated 7', while the center line of the rotor 4 is designated 8'. On each side of the rotor 4 a gearwheel 9, 10 is installed to drive an oil pump and a fuel pump, not shown on the drawings.

The rotor 4 is constructed with three radial, cylindrical bores 11 at mutual equal angular distance. In each of the bores 11 is installed a sliding cylinder sleeve 12 which is closed at its outer end, which faces out towards the cylindrical inside of the rotor housing 1. At the inner end of the cylinder sleeve 12 are secured two shaft journals 13, 14 which outside of the cylinder sleeve 12, are supported at one end of a link 15 or 16 respectively, which at the other end is supported by a journal 17 or 18 respectively, which is eccentrically and permanently fixed to an end cover 19 or 20 respectively, which is bolted on to the end plate 2 or 3 respectively of the rotor housing 1, in such a way that the journals 17, 18 lie concentrically in the rotor housing 1. Three links 15 are thus supported at journal 17, and three links 16 are thus supported at journal 18.

A sliding piston 21 is positioned in each cylinder sleeve 12 and fastened to one end of a rod 22. The other end of rod 22 is fastened by a pin 23 to a common support hub 24. The support hub 24 is fastened by screw bolts 25 to the cylindrical wall of an inner, central hubcase 26 in the rotor 4. The rotor housing 1 as well as the rotor 4 are constructed with passages 27 for circulating cooling medium.

In each cylinder sleeve 12 is arranged a radial inlet port 28 for the gas mixture to drive the engine. When rotor 4 rotates, inlet port 28 will, during a given phase of each rotation, communicate with a suction port 29 which is provided in rotor 4. During this phase of the revolution, the suction port 29 also communicates with a manifold groove 30 and a carburetor port 31 which is milled in the end plate 2 of the rotor housing 1, and further with a carburetor (not shown) which can be bolted on a pipe stub 32 which communicates with the carburetor port 31 and is fastened to the end plate 2.

Furthermore, in each cylinder sleeve 12 is provided an outlet port 33 for compressed gas mixture. When rotor 4 rotates, the outlet port 33 will, during a given phase of each rotation, communicate with an associated transfer port 34 which is provided in rotor 4 at each cylinder sleeve 12. The transfer ports 34 lead out to the periphery of the rotor 4, and each transfer port 34 has thus the whole time open connection with a cavity 35, 35' or 35'' respectively, whose volume changes the whole time as rotor 4 rotates, and which is delimited by two cylinder sleeves 12, the periphery surface of the rotor 4 between the said two cylinder sleeves 12, the circular internal wall of the rotor housing 1 between the two cylinder sleeves 12 and the end plates 2, 3 of the rotor housing 1.

Each of the three cylinder sleeves 12 is provided on the outside of the outer, closed end with two longitudinal seals 36 which seal about the end plates 2 or 3 respectively of the rotor housing 1, and a transverse gasket 37 which seals about the circular inner wall of the rotor housing 1. Gaskets 38 are also provided between the rotor 4 and the end plates 2, 3 of the rotor housing 1.

A number of exhaust ports 39 through the end plate 3 of the rotor housing 1 lead to the engine's exhaust pipe 40. Almost directly opposite the exhaust ports 39, in the end plate 2 of the rotor housing 1, are arranged a number of scavenging air ports 41 which are supplied with air from a fan 42 via a duct 43. The fan 42 is installed on one end of a fan shaft 44 which is supported 45 in the end cover 19. At the outer end of the fan shaft 44 is installed a gear wheel 46 which is powered by an internally toothed gear ring 47 which is fixed to rotor 4 in the latter's inner, central hubcase 26.

Power from the engine is taken off from a drive shaft 48 which is supported 49, 50 in the end cover 20 or a bracket 51 bolted on to the end cover 20, respectively.

Reference numbers 52 and 53 designate attachment brackets for the engine, and 54 indicates a spark plug.

Since cylinder sleeves 12 via the shaft journals 13, 14 links 15, 16 and journals 17, 18 are concentrically supported in the rotor housing 1, while the pistons 21 via rod 22, pin 23 and support hub 24 are concentrically supported in rotor 4, the cylinder sleeves 12 will, when rotor 4 rotates, rotate about the center line 7' of the rotor housing 1, with the gasket 37 the whole time in contact with the cylindrical inner wall of the rotor housing 1, at the same time as cylinder sleeves 12 slide in and out in the radial, cylindrical bores 11 of the rotor 1, and at the same time as the pistons 21 rotate about the center line 8' of the rotor 4 and slide in and out of the cylinder sleeves 12, without cylinder sleeves 12 or the pistons 21 making any reciprocating movement.

The engine works in the following manner, being started by a start motor not shown on the drawings which turns drive shaft 48 and thus the rotor 4 in the direction of the arrow, and as we follow the cylinder sleeve 12 which is in the position marked x of FIG. 1: The cavity above the top of the piston 21 will then be increasing in volume with a corresponding increase in vacuum. Gradually as the rotor 4 turns, the inlet port 28 for gas mixture in the cylinder sleeve 12 will come into contact with the suction port 29 provided in rotor 4, and, because the suction port 29 during this phase of the rotation connects with a carburetor via a manifold groove 30, a carburetor port 31 and pipe stub 32, as explained above, the cavity above the top of the piston 21 will be filled with combustible gas when cylinder sleeve 12 has reached the position marked y on FIG. 1, by which time the cavity above the top of the piston 21 has reached its maximum size.

When the rotor 4 and thus the cylinder sleeve 12 turns beyond position y, the cylinder sleeve 12 will move inward in its bore 11 in the rotor 4, and the connection between the inlet port 28 in the cylinder sleeve 12 and the suction port 29 in the rotor 4 will close. The suction port 29 will also move away from the manifold groove 30. Further, the cavity above the top of the piston 21 will be decreasing in volume with a corresponding increase in compression, and the sucked-in gas will be compressed.

When cylinder sleeve 12 has reached position z on FIG. 1, the outlet port 33 for compressed gas mixture is just about to come into contact with the transfer port 34 in rotor 4. In this position the chamber 35 has reached its minimum volume. When rotor 4 has turned cylinder sleeve 12 somewhat past position z, the outlet port 33 comes into contact with the transfer port 34 and the compressed gas mixture above the piston 21 in the cylinder sleeve 12 is transferred to the chamber 35, which is already filled with air at rather lower compression. The new gas mixture is ignited by spark plug 54 if the gas mixture above the piston 21 in the cylinder sleeve has not auto-ignited, and the pressure in chamber 35 increases violently and forces the rotor 4 further round, since the susceptible side surface on the cylinder sleeve 12 in position just beyond x is larger than the susceptible side surface on the cylinder sleeve 12 in position just beyond z, and since the former cylinder sleeve's susceptible side surface is increasing all the way to position y, while the latter cylinder sleeve's susceptible side surface is decreasing until a position midway between positions z and x is reached, after which this same cylinder sleeve's susceptible side surface again begins to become larger.

When the combustion gases have forced the cylinder sleeve 12 a little beyond position y, this cylinder sleeve 12 first passes the exhaust ports 39 and thereafter the scavenging air ports 41, and the combustion gases and scavenging air can exhaust through the engine's exhaust pipe 40. Scavenging of the combustion gases takes place until the cylinder sleeve 12 mentioned has reached a position just beyond position z. At that time the next cylinder sleeve 12 is in the process of passing first the exhaust ports 39 and then the scavenging air ports 41, whereby chamber 35" becomes filled with scavenging air which is then compressed until chamber 35" has assumed the position shown for chamber 35, after which the compressed gas mixture above piston 21 in the cylinder sleeve 12 in position just beyond z is transferred to chamber 35, as previously explained.

As will be apparent from the above, the engine according to the invention performs the following:

(a) suction of gas mixture and injection of air
(b) compression of gas mixture and air
(c) combustion, and
(d) scavenging of exhaust gases three times per revolution.

According to the invention, one has managed to provide a rotary internal combustion engine with the advantages of the rotary engine as compared with a piston engine, at the same time as the rotary engine includes cylinders with pistons, though without any of the parts of the engine being reciprocating, whereby the advantages of the piston engine, particularly with regard to compression of combustion gases, are achieved.

In the exemplary embodiment explained above, the engine according to the invention is constructed as a petrol engine. It will be immediately apparent that the engine according to the invention can also readily be designed as a diesel engine.

Furthermore, it will be immediately apparent that the engine according to the invention can be considered to be a section of an engine, and that several sections, each containing two or more cylinder sleeves 12, with certain modifications can be assembled together to form a larger engine.

What is claimed:

1. Rotary internal combustion engine with arrangements for the introduction of fuel and removal of exhaust gases and with a rotor housing (1) with end plates (2, 3) and end covers (19, 20) in which is eccentrically supported a rotor (4), characterized in the rotor (4) being designed with a plurality of radial bores (11) at mutual equal angular distance, and there being installed in each of the bores (11) a sliding cylinder sleeve (12) which is closed at its outer end, which faces outward towards the cylindrical inside of the rotor housing (1), said cylinder sleeve (12) at its inner, open end being fastened with the aid of connections (13, 14, 15, 16, 17, 18) rotatably to the end covers (19, 20) of the rotor housing (1), such that the cylinder sleeves (12) during the rotation of the rotor (4) turn concentrically about the center line (7') of the rotor housing (1), whereby the cylinder sleeves (12) with the aid of seals (36, 37) seal against the end plates (2, 3) and circular inner wall of the rotor housing (1) to form working chambers, a sliding piston (21) being positioned in each cylinder sleeve (12), said piston (21) being fastened with the aid of connections (22, 23, 24, 25) to the rotor (4), such that each piston (21) is at the same distance from the center line (8') of the rotor (4), a radial inlet port (28) being provided in each cylinder sleeve (12) for the gas mixture to drive the engine, such that when the rotor (4) rotates, the inlet port (28) during a given phase of each rotation, will communicate with a suction port (29) which is formed in the rotor (4), and which suction port (29) further during this phase of the revolution communicates with groove (30) and port (31) formed in the end plate (2) of the rotor housing (1), to which end plate (2) is connected a carburetor and an outlet port (33) being formed in each cylinder sleeve (12) for compressed gas mixture, such that when the rotor (4) rotates, the outlet port (33) during a given phase of each revolution will communicate with an associated transfer port (34) formed in the rotor (4) at each bore (11), said transfer port (34) exits to the periphery of the rotor (4) and thus leads the compressed gas mixture to a working chamber (35) in which the gas mixture is ignited, a number of exhaust ports (39) being formed through the end plate (3) of the rotor housing (1) for removal of the engine's combustion gases, a number of through-going scavenging air ports (41) being formed in the end plate (2) almost immediately opposite the exhaust ports (39) in the end plate (3), said scavenging air ports (41) being supplied with air from a fan (42) driven by the engine, such that the exhaust ports (39) close before the scavenging air ports (41), whereby a chamber (35") is filled with scavenging air which is then compressed and later augmented with compressed gas mixture which is then ignited and turns the rotor (4) within the rotor housing (1).

2. Rotary internal combustion engine according to claim 1, characterized in there being fixed at the inner, open end of each cylinder sleeve (12) two shaft journals (13, 14) which outside of the cylinder sleeve (12) are supported at one end of a link (15, 16 respectively) which at the other end is supported by a journal (17, 18 respectively) which is eccentrically and permanently fixed to the end cover (19, 20 respectively) which is bolted onto the end plate (2, 3 respectively) of the rotor housing (1) in such a way that the journals (17, 18) are concentrically positioned in the rotor housing (1).

3. Rotary internal combustion engine according to claim 1, characterized in each of the pistone (21) being fastened to one end of a rod (22) whose other end is fastened preferably by pin (23) to a common support hub (24) which is fastened preferably by screw bolts (25) to the cylindrical wall in an inner, central hubcase (26) in the rotor (4).

4. Rotary internal combustion engine according to claim 1, characterized in the exhaust ports (39) as well as the scavenging air ports (41) being radially arranged in relation to each other in the end plates (3, 2 respectively).

* * * * *